United States Patent
Yu et al.

(10) Patent No.: US 9,638,948 B2
(45) Date of Patent: May 2, 2017

(54) TOUCH PANEL AND METHOD OF MANUFACTURING THE SAME

(71) Applicant: TPK TOUCH SOLUTIONS (XIAMEN) INC., Xiamen (CN)

(72) Inventors: Jing Yu, Xiamen (CN); Huilin Ye, Zhangzhou (CN); Tsung-Ke Chiu, Tainan (TW)

(73) Assignee: TPK TOUCH SOLUTIONS (XIAMEN) INC., Xiamen (CN)

( * ) Notice: Subject to any disclaimer, the term of this patent is extended or adjusted under 35 U.S.C. 154(b) by 16 days.

(21) Appl. No.: 13/945,885

(22) Filed: Jul. 18, 2013

(65) Prior Publication Data

US 2014/0028928 A1 Jan. 30, 2014

(30) Foreign Application Priority Data

Jul. 24, 2012 (CN) .......................... 2012 1 0256784

(51) Int. Cl.
*G06F 3/041* (2006.01)
*G02F 1/1333* (2006.01)

(52) U.S. Cl.
CPC .......... *G02F 1/13338* (2013.01); *G06F 3/041* (2013.01); *G06F 2203/04103* (2013.01)

(58) Field of Classification Search
CPC ..................... G06F 3/041; G06F 3/044; G06F 2203/04103; G02F 1/13338
See application file for complete search history.

(56) References Cited

U.S. PATENT DOCUMENTS

| | | | |
|---|---|---|---|
| 2009/0257010 A1* | 10/2009 | Sakurai | G02F 1/133308 349/110 |
| 2010/0164881 A1* | 7/2010 | Kuo et al. | 345/173 |
| 2010/0164889 A1* | 7/2010 | Hristov et al. | 345/173 |
| 2011/0187671 A1* | 8/2011 | Huang | G06F 3/041 345/174 |
| 2011/0254778 A1* | 10/2011 | Wang et al. | 345/173 |
| 2011/0298739 A1 | 12/2011 | Wu et al. | |
| 2012/0026107 A1* | 2/2012 | Kim et al. | 345/173 |
| 2012/0162130 A1* | 6/2012 | Liu | G06F 3/044 345/174 |
| 2012/0249465 A1* | 10/2012 | Lin | G06F 3/041 345/173 |

FOREIGN PATENT DOCUMENTS

TW M3711271 12/2009

* cited by examiner

*Primary Examiner* — Kumar Patel
*Assistant Examiner* — Amy C Onyekaba
(74) *Attorney, Agent, or Firm* — Cooper Legal Group, LLC

(57) ABSTRACT

A touch panel having a central region and a peripheral region, including: a substrate; a touch sensing layer disposed on the substrate; a wiring layer disposed on the peripheral region of the substrate electrically connected to the touch sensing layer; a first decorative layer disposed on the peripheral region and covering the wiring layer; a transparent adhesive layer disposed on the touch sensing layer and the first decorative layer; a cover substrate disposed on the transparent adhesive layer; and a second decorative layer disposed between the cover substrate and the transparent adhesive layer, and corresponding to the peripheral region.

19 Claims, 7 Drawing Sheets

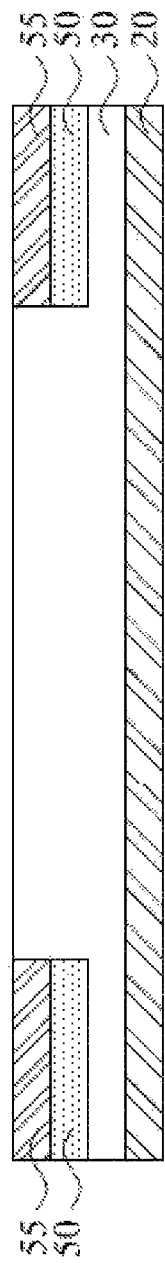

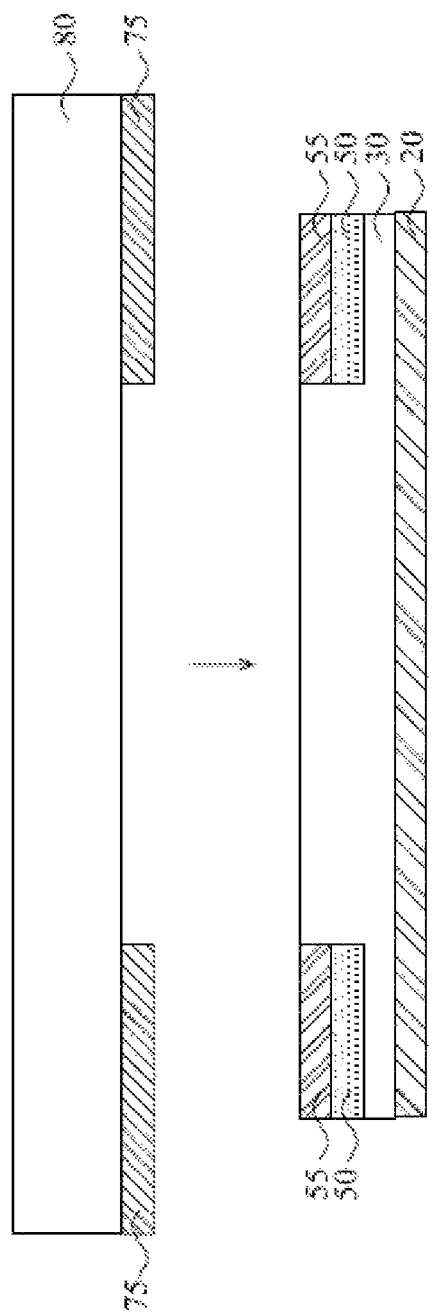

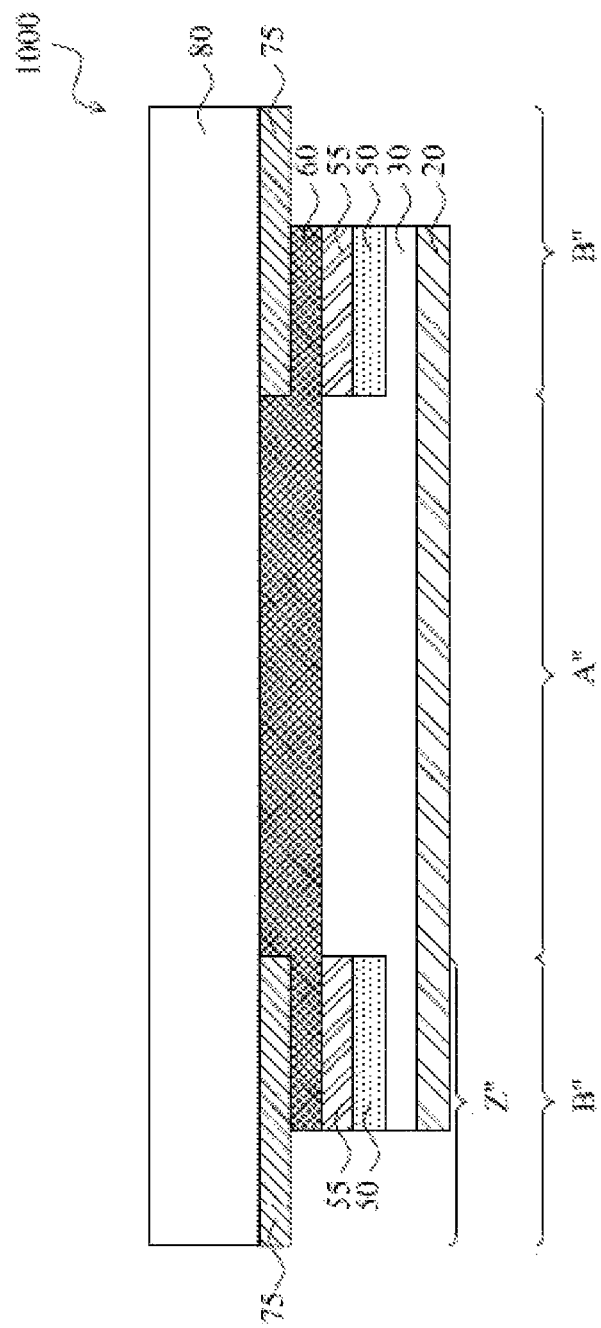

TOUCH PANEL AND METHOD OF MANUFACTURING THE SAME

BACKGROUND OF THE INVETION

This application claims priority of China Patent Application No. 201210256784.5, filed on 2012 Jul. 24, the entirety of which is incorporated herein by reference.

FIELD OF THE INVETION

The present disclosure relates to touch technology, and in particular relates to a touch panel and method of manufacturing the same.

DESCRIPTION OF THE RELATED ART

The function of the touch panels is to allow users to input by using, lingers or a stylus. In general, a touch panel can be classified into resistive, capacitive, surface acoustic wave (SAW), and optical touch panels according to their methods of sensing.

The surface of a touch panel can he generally sorted into two sections, which are a non-visible region and visible region respectively. Generally, the non-visible region surrounds the visible regions and forms an opaque frame to cover up the visibility of the components, such as wires corresponding to the non-visible region. The visible region is the section where the users touch and operate the device.

FIG. 1A illustrates the cross-sectional view of a conventional touch panel. For simplicity, only a portion of components is illustrated in FIG. 1A. Referring to FIG. 1A, a touch panel 100 comprises a substrate 21, a touch sensing layer 28. a wiring layer 48, a transparent adhesive layer 58, a cover substrate 78, and a decorative layer 68 at the peripheral of the cover substrate 78. The wiring layer 48 is formed at the peripheral of the substrate 20 and is electrically connected to the touch sensing layer 28. FIG. 1B illustrates the top view of the conventional touch panel 100. As shown in FIG. 1A and FIG. 1B, the touch panel 100 has a visible region A and a non-visible region B surrounding the visible region A, wherein the range of the non-visible region is defined by the decorative layer 68, and the decorative layer 68 is used to cover the wiring layer 48. To prevent the wiring layer 48, underneath the decorative layer 68 in the non-visible region, from being seen by users at an inclined angle from the top of the touch panel 100, the decorative layer 68 is extended to a distance D. The distance from outer edge of the cover substrate 78 to inner edge of the wiring layer 48 is Z. Thus, the width of the decorative layer 68 of the touch panel 100 is generally designed to be the sum of the distances Z and D. In other words, the width of the opaque frame is the sum of D and Z. Therefore, it is worth to study how to avoid the wiring layer visible to let the width of the frame for decorative layer) be reduced.

SUMMARY OF THE INVENTION

The present invention provides a touch panel having a central region and a peripheral region, including: a substrate; a touch sensing layer disposed on the substrate; a wiring layer, disposed on the peripheral region of the substrate, electrically connected to the touch sensing layer; a first decorative layer disposed on the peripheral region of the substrate and covering the wiring layer; a transparent adhesive layer disposed on the first decorative layer; a cover substrate disposed on the transparent adhesive layer: and a second decorative layer disposed between the cover substrate and the transparent adhesive layer, and corresponding to the peripheral region.

In an embodiment, the transparent adhesive layer is disposed on the touch sensing layer.

The present invention also provides a method of manufacturing a touch panel having a central region and a peripheral region. comprising the steps of: providing a substrate; forming a touch sensing layer on the substrate; forming a wiring layer on the peripheral region of the substrate, electrically connected to the touch sensing layer; forming a first decorative layer on the peripheral region. covering the wiring layer; and attaching a cover substrate to the first decorative layer by a transparent adhesive layer, wherein a second decorative layer is formed between the cover substrate and the transparent adhesive layer, and corresponds to the peripheral region.

In an embodiment, the first decorative layer and the second decorative layer are both formed by a printing process.

By using the techniques of the present invention, it can prevent the wiring layer from being seen by users at an inclined angle from the top of the touch panel. Furthermore, the frame width of the touch panel can be reduced.

BRIEF DESCRIPTION OF THE DRAWINGS

The present invention can he more fully understood by reading the subsequent detailed description and examples with references made to the accompanying drawings, wherein:

FIGS. 4A-4C illustrates the method of forming a touch panel in accordance with another embodiment of the present disclosure.

DETAILED DESCRIPTION OF THE INVENTION

Figure 1A:
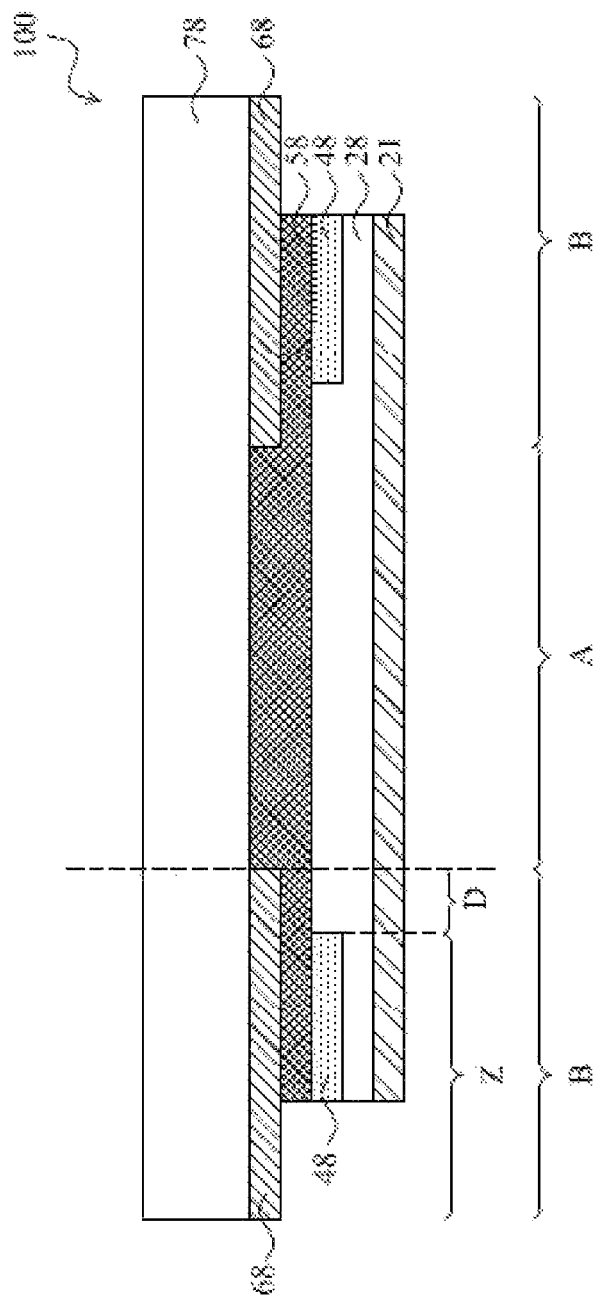
FIG. 1A illustrates the cross-sectional view of a conventional touch panel.
Figure 1B:
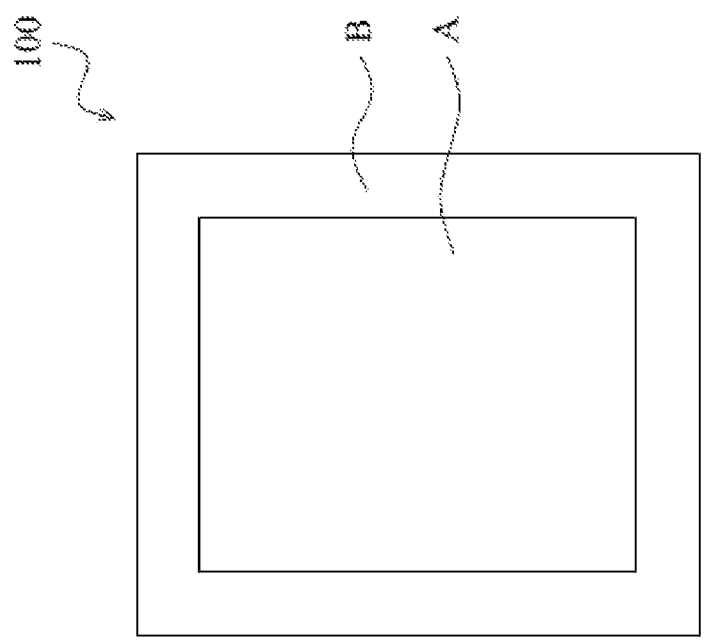
FIG. 1B illustrates the top view of a conventional touch panel.

The following description is the best-contemplated mode of carrying out the invention. This description is made for the purpose of illustrating the general principles of the invention and should riot be taken in a limiting sense. The scope of the invention is best determined by reference to the appended claims. In addition, there will now be described an embodiment of this invention with reference to the accompanying drawings. In the drawings, the shape and thickness of one embodiment may be exaggerated for clarity and convenience. This description will be directed in particular to elements forming part of or cooperating more directly with, apparatus in accordance with the present invention. It is to be understood that elements not specifically shown or described may take various form well known to those skilled in the art. Further, when a layer is referred to as being on another layer or "on" a substrate, it may he directly on the other layer or substrate, or intervening layers may also be present.

Figure 2:
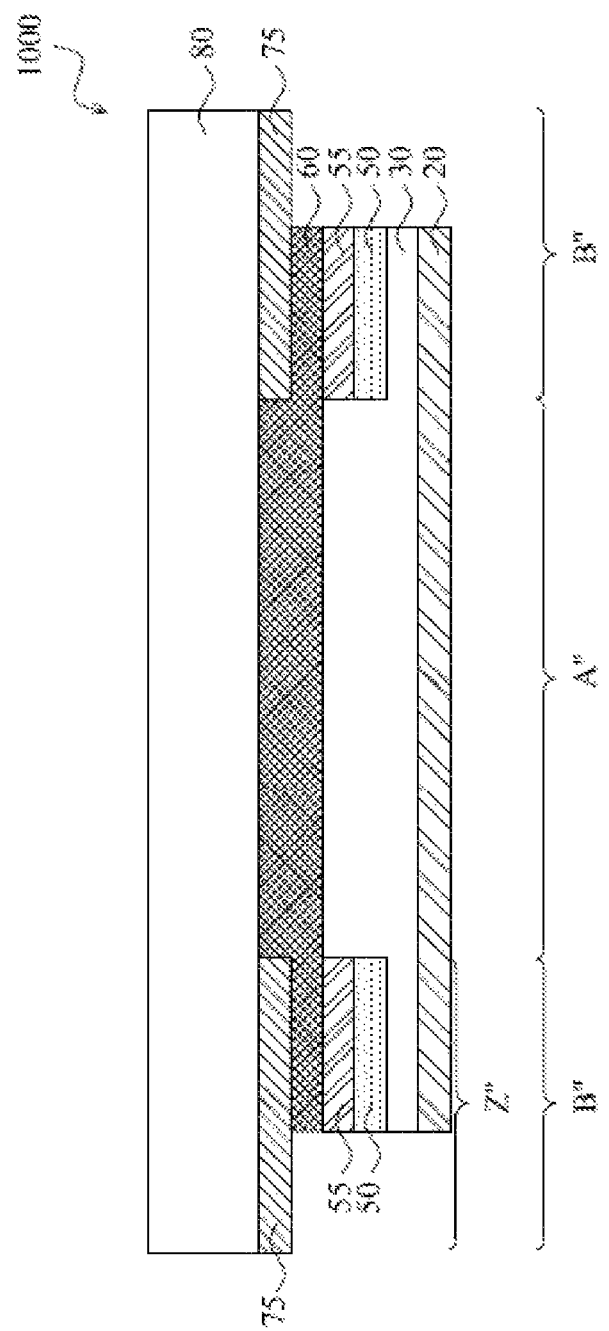
FIG. 2 illustrates the cross-sectional view of a touch panel in accordance with an embodiment of the present disclosure.

FIG. 2 illustrates the cross-sectional view of a touch panel 1000 in accordance with an embodiment. For simplicity, FIG. 2 illustrates only some of the components of the touch panel 1000 that are directly related to the embodiments of the present disclosure. Referring to FIG. 2, a touch panel 1000 has a central region A" and a peripheral region B" surrounding the central region A", and the touch panel includes a substrate 20, a touch sensing layer 30 extending from the central region A" to the peripheral region B". In an embodiment, the touch sensing layer 30 is only disposed in the central region A". A wiring layer 50 is disposed on the peripheral region B" of the substrate 20. In some embodiments, the wiling layer 50 is electrically connected to a flexible circuit board (not shown). A first decorative layer 55 is corresponding to the peripheral region B" of the substrate 20, and covers the wiring layer 50. A transparent adhesive layer 60 is disposed on the touch sensing layer 30 and the first decorative layer 55. The transparent adhesive layer 60 may be a material such as, but not limited to, optical clear adhesive (OCA), or the like. In an embodiment, the transparent adhesive layer 60 can only be disposed on the first decorative layer 55. A cover substrate 80 is disposed on the transparent adhesive layer 60, wherein a second decorative layer 75 is disposed between the cover substrate 80 and the transparent adhesive layer 60 and corresponding to the peripheral region B". The substrate 20 and the cover substrate 80 may be any light penetrating material, such as, but not limited to, a glass material, or a PET thin film.

Figure 3:
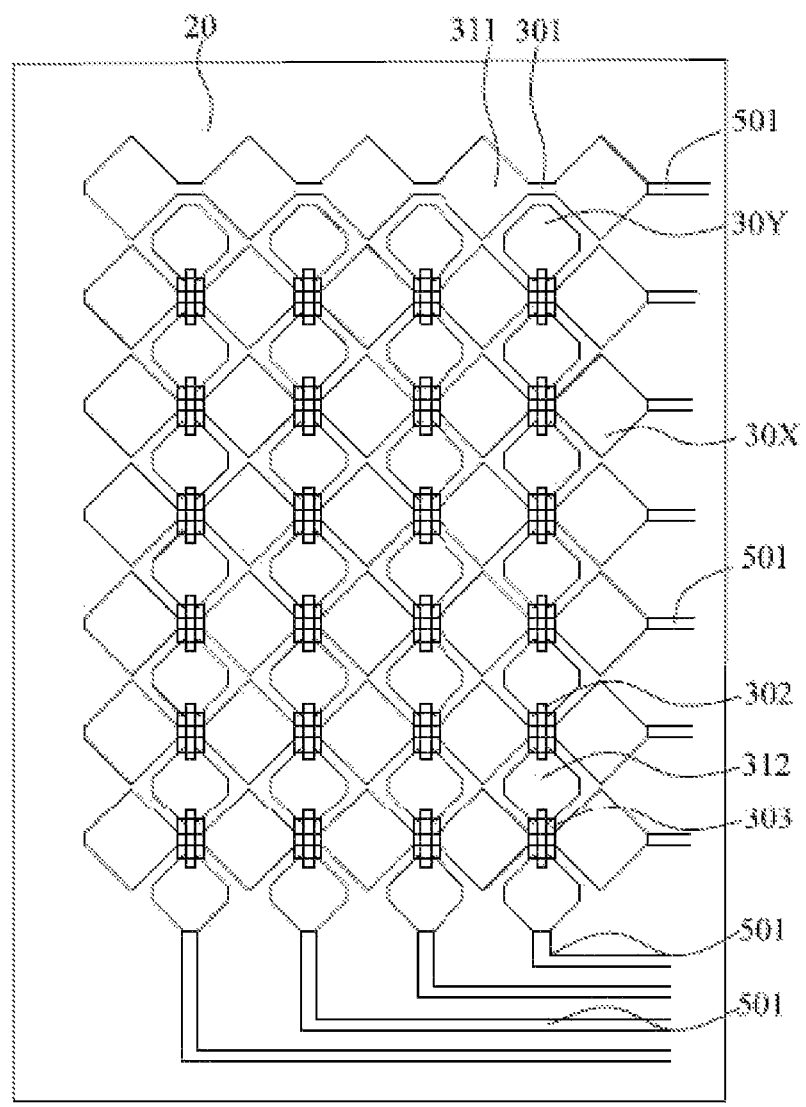
FIG. 3 illustrates the touch sensing layer and the wiring layer of a touch panel in accordance with another embodiment of the present disclosure.

As shown in FIG. 3, in an alternate embodiment, the touch sensing layer 30 includes a plurality of first axial sensing electrodes 30X and a plurality of second axial sensing electrodes 30Y. The first axial sensing electrodes 30X and second axial sensing electrodes 30Y are insulated from each other. Each first axial sensing electrode 30X includes a plurality of first electrode blocks 311 and a plurality of connecting wires 301 and every two adjacent first electrode blocks 311 are connected to each other via the connecting wire 301. Each second axial sensing electrode 30Y includes a plurality of second electrode blocks 312 and a plurality of crossing wires 302, and every two adjacent second electrode blocks 312 are connected to each other via the crossing wire 302. An insulating layer 303 is disposed between the connecting wire 301 and the crossing wire 302, the first axial sensing electrodes 30X and the second axial sensing electrodes 30Y can be insulated from each other by the use of the insulting layer 303. Note that the pattern of the touch sensing layer is not limited to the arrangement shown in FIG. 3. To the contrary, it is intended to cover various modifications and similar arrangements. For example, the touch sensing layer may be a pattern of single layer single axis or double layer double axis. The touch sensing layer can be formed of any transparent electrode material, such as, but not limited to, indium tin oxide (ITO), indium zinc oxide (IZO), indium gallium oxide, indium gallium zinc oxide (IGZO), silver nanowire, carbon nanotube, graphene, or the like. The wiring layer 50 comprises a plurality of wirings 501, and the wirings 501 are electrically connected to the sensing electrodes in each axial respectively.

In an embodiment, the material of the first decorative layer 55 may be a colored ink or a colored photoresist.

In an embodiment, the material of the second decorative layer 75 may be identical to or different from that of the first decorative layer 55.

The touch panel of the present disclosure is distinct from a conventional touch panel. As shown in FIG. 2, by disposing an additional decorative layer (first decorative layer 55) at the peripheral region B" between the wiring layer 50 and the transparent adhesive layer 60, a masking function can be achieved, without extending the second decorative layer 75 by a distance D (FIG. 1A), When users look at the touch panel 1000 from an inclined angle. By using the touch panel structure of the present disclosure, the width of the non-visible region formed by the first decorative layer 55 and the second decorative layer 75 is only Z". In other words, the width of the frame is Z". Therefore, in comparison with a conventional touch panel, the frame of the touch panel of the present disclosure is thinner, which provides a larger visible region, and further, increases the range of the touching area for users.

FIGS. 4A-4C illustrate a method of forming a touch panel 1000 in accordance with various embodiments of the present disclosure. The method of forming the touch panel 1000 will be described in accordance with FIGS. 4A-4C hereinafter. The components used in the embodiments herein are same as the components mentioned above and will riot be discussed again. Firstly, preparing a substrate 20. Secondly, referring to FIG. 4A, forming a touch sensing layer 30 on the substrate 20, and then forming a wiring layer 50 is on the peripheral region of the substrate 20, wherein the wiring layer 50 and the touch sensing layer 30 are electrically connected to each other. Then, forming a first decorative layer 55 on the wiring layer 50. The touch sensing layer 30 may include any known touch sensing layer structure. In some embodiments, the wiring layer 50 may electrically connect to a flexible printing circuit board (riot shown). The first decorative layer 55 may be formed by a printing process. In some embodiments, the first decorative layer 55 may he colored ink or a colored photoresist.

Referring to FIGS. 4B-4C, once the touch sensing layer 30, the wiring layer and the first decorative layer 55 are formed, the formation of the touch panel 1000 is then completed by attaching the cover substrate 80 to the touch sensing layer 30 and the first decorative layer 55 by a transparent adhesive layer 60. In an alternate embodiment, the transparent adhesive layer 60 is attached only to the first decorative layer 55. The transparent adhesive layer 60 may include any transparent material which provides a stable adhesive between the substrate 20 and the cover substrate 80. For example, the transparent adhesive layer 60 may include, but not limited to, optical clear adhesive (OCA), or the like. Furthermore, a second decorative layer 75 is formed prior to the attaching, on a side of the cover substrate 80 where the transparent adhesive layer 65 attached to, and corresponds to the peripheral region B". The second decorative layer 75 is formed between the cover substrate 80 and the transparent adhesive layer 60. The second decorative layer 75 may be formed of the materials identical to that of the first decorative layer 55 as discussed above, but the first and second decorative layers may also be formed of different materials. The second decorative layer 75 may be formed by the same methods as for forming the first decorative layer 55, such as a printing process. The substrate 20 and cover substrate 80 may be any light penetrating material, such as a glass material, or PET thin film.

The touch panel of the present disclosure can be widely used in various electronic devices; especially in a display device, such as a liquid crystal display (LCD) device or an organic light-emitting diode display device. For example, the touch sensing layer discussed above may be formed on the surface of an LCD panel or an organic light-emitting diode panel to integrate the touch panel into an LCD device or an organic light-emitting diode display device.

It can prevent the wiring layer from being seen by users at an inclined angle from the top of the touch panel by using the techniques of the present disclosure. Further, the frame width may be reduced to meet the demands for thin-framed touch panels.

While the invention has been described by way of example and in temis of the preferred embodiments, it is to be understood that the invention is not limited to the disclosed embodiments. To the contrary, it is intended to cover various modifications and similar arrangements (as would he apparent to those skilled in the art). Therefore, the scope of the appended claims should be accorded the broadest interpretation so as to encompass all such modifications and similar arrangements.

What is claimed is:

1. A touch panel having a central region and a peripheral region, comprising:
    a substrate;
    a touch sensing layer disposed on the substrate;
    a wiring layer disposed in the peripheral region over the substrate and electrically connected to the touch sensing layer;
    a first decorative layer disposed in the peripheral region and in direct contact with the wiring layer, wherein a sidewall of the first decorative layer and a sidewall of the wiring layer are in direct contact with a sidewall of the touch sensing layer;
    a transparent adhesive layer disposed on the first decorative layer;
    a cover substrate disposed on the transparent adhesive layer; and
    a second decorative layer disposed between the cover substrate and the transparent adhesive layer in the peripheral region.

2. The touch panel of claim 1, wherein the sidewall of the wiring layer and the sidewall of the first decorative layer are co-planar.

3. The touch panel of claim 1, wherein the transparent adhesive layer directly contacts a top surface of the first decorative layer and a bottom surface of the second decorative layer.

4. The touch panel of claim 1, wherein the first decorative layer and the second decorative layer are of a same color.

5. The touch panel of claim 1, wherein the transparent adhesive layer is further disposed on the touch sensing layer.

6. The touch panel of claim 1, wherein:
    the touch sensing layer includes a plurality of first axial sensing electrodes and a plurality of second axial sensing electrodes, and
    the first axial sensing electrodes and the second axial sensing electrodes are insulated from each other.

7. The touch panel of claim 6, wherein:
    the first axial sensing electrodes include a plurality of first electrode blocks and a plurality of connecting wires,
    every two adjacent first electrode blocks are connected to each other via the connecting wires,
    the second axial sensing electrodes include a plurality of second electrode blocks and a plurality of crossing wires,
    every two adjacent second electrode blocks are connected to each other via the crossing wires, and
    an insulating layer is disposed between the connecting wires and the crossing wires.

8. The touch panel of claim 1, wherein the transparent adhesive layer is disposed only on the first decorative layer.

9. The touch panel of claim 1, wherein the first decorative layer is a color photoresist.

10. The touch panel of claim 1, wherein a sidewall of the second decorative layer and the sidewall of the wiring layer are co-planar.

11. The touch panel of claim 10, wherein the sidewall of the wiring layer and the sidewall of the first decorative layer are co-planar.

12. The touch panel of claim 1, wherein the transparent adhesive layer is only disposed between the first decorative layer and the second decorative layer.

13. The touch panel of claim 1, wherein the transparent adhesive layer is between the first decorative layer and the second decorative layer to separate a top surface of the first decorative layer from a bottom surface of the second decorative layer.

14. A touch panel having a central region and a peripheral region, comprising:
    a substrate;
    a touch sensing layer disposed on the substrate;
    a wiring layer disposed in the peripheral region over the substrate and electrically connected to the touch sensing layer;
    a first decorative layer disposed in the peripheral region and in direct contact with the wiring layer;
    a cover substrate disposed above the substrate;
    a second decorative layer disposed under the cover substrate in the peripheral region; and
    a transparent adhesive layer disposed between a top surface of the first decorative layer and a bottom surface of the second decorative layer to separate the top surface of the first decorative layer from the bottom surface of the second decorative layer.

15. The touch panel of claim 14, wherein the first decorative layer is a color photoresist.

16. The touch panel of claim 14, wherein a sidewall of the first decorative layer and a sidewall of the second decorative layer are co-planar.

17. The touch panel of claim 14, wherein a sidewall of the first decorative layer and a sidewall of the wiring layer are co-planar.

18. The touch panel of claim 14, wherein:
    the top surface of the first decorative layer is in direct contact with a bottom surface of the transparent adhesive layer, and
    the bottom surface of the second decorative layer is in direct contact with a top surface of the transparent adhesive layer.

19. The touch panel of claim 14, wherein a sidewall of the first decorative layer, a sidewall of the second decorative layer, and a sidewall of the wiring layer are co-planar.

* * * * *